(12) United States Patent
Yang et al.

(10) Patent No.: US 8,932,975 B2
(45) Date of Patent: Jan. 13, 2015

(54) CATALYST SYSTEMS AND METHODS OF MAKING AND USING SAME

(75) Inventors: Qing Yang, Bartlesville, OK (US); Max P. McDaniel, Bartlesville, OK (US); Joel L. Martin, Bartlesville, OK (US); Errun Ding, Bartlesville, OK (US); David C. Rohlfing, Bloomington, IN (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 140 days.

(21) Appl. No.: 12/876,954

(22) Filed: Sep. 7, 2010

(65) Prior Publication Data
US 2012/0059134 A1  Mar. 8, 2012

(51) Int. Cl.
| | | |
|---|---|---|
| C08F 4/64 | (2006.01) | |
| C08F 4/642 | (2006.01) | |
| C08F 4/653 | (2006.01) | |
| C08F 4/6592 | (2006.01) | |
| C08L 23/04 | (2006.01) | |
| C08F 210/16 | (2006.01) | |
| C08F 10/00 | (2006.01) | |

(52) U.S. Cl.
CPC .............. *C08F 210/16* (2013.01); *C08F 10/00* (2013.01); *C08F 4/65925* (2013.01); *C08F 4/65927* (2013.01); *Y10S 526/943* (2013.01)
USPC ........... 502/113; 502/119; 502/120; 502/152; 502/167; 526/113; 526/114; 526/160; 526/161; 526/348; 526/943; 525/240

(58) Field of Classification Search
CPC .. C08F 4/64148; C08F 4/64151; C08F 4/653; C08F 4/65904; C08F 4/65912; C08F 4/65925; C08F 4/65927; C08L 23/04; C08L 23/0815
USPC ......... 502/113, 115, 150, 162, 119, 120, 152; 502/167; 526/113, 114, 160, 161, 943, 348; 525/240
See application file for complete search history.

(56) References Cited

U.S. PATENT DOCUMENTS

| | | | |
|---|---|---|---|
| 3,248,179 | A | 4/1966 | Norwood |
| 4,060,480 | A | 11/1977 | Reed et al. |
| 4,452,910 | A | 6/1984 | Hopkins et al. |
| 4,501,885 | A | 2/1985 | Sherk et al. |
| 4,588,790 | A | 5/1986 | Jenkins, III et al. |
| 4,794,096 | A | 12/1988 | Ewen |
| 5,352,749 | A | 10/1994 | DeChellis et al. |
| 5,376,611 | A | 12/1994 | Shveima |
| 5,399,636 | A | 3/1995 | Alt et al. |
| 5,436,304 | A | 7/1995 | Griffin et al. |
| 5,455,314 | A | 10/1995 | Burns et al. |
| 5,539,076 | A * | 7/1996 | Nowlin et al. ............. 526/348.1 |
| 5,565,175 | A | 10/1996 | Hottovy et al. |
| 5,565,592 | A | 10/1996 | Patsidis et al. |
| 5,575,979 | A | 11/1996 | Hanson |
| 5,576,259 | A | 11/1996 | Hasegawa et al. |
| 5,807,938 | A | 9/1998 | Kaneko et al. |
| 5,919,983 | A | 7/1999 | Rosen et al. |
| 6,107,230 | A | 8/2000 | McDaniel et al. |
| 6,165,929 | A | 12/2000 | McDaniel et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |

(Continued)

FOREIGN PATENT DOCUMENTS

WO    WO 99/31147    6/1999

OTHER PUBLICATIONS

Bird, R. Byron, et al., "Fluid Mechanics," Dynamics of Polymeric Liquids, 1987, vol. 1, 2nd ed., pp. xiii-xviii and 171-172, John Wiley & Sons, Inc.

(Continued)

*Primary Examiner* — Caixia Lu
(74) *Attorney, Agent, or Firm* — Conley Rose, P.C.; Rodney B. Carroll; Cheryl L. Huseman

(57) ABSTRACT

A catalyst composition comprising (a) a first metallocene complex represented by the general formula:

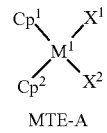

MTE-A where $M^1$ is Ti, Zr or Hf, $X^1$ and $X^2$ are each independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$ wherein R'' may be an alkyl group having up to 12 carbon atoms or an aryl group having up to 12 carbon atoms, and $Cp^1$ and $Cp^2$ are each independently a substituted or unsubstituted cyclopentadienyl group, or a substituted or unsubstituted indenyl group, where any substituent on $Cp^1$ and $Cp^2$ is H, a hydrocarbyl group having up to 18 carbon atoms or a hydrocarbylsilyl group having up to 18 carbon atoms, (b) a second metallocene complex, (c) a non-group 4 metallocene transition-metal complex, (d) an activator or activator-support, and (e) an optional cocatalyst.

29 Claims, 9 Drawing Sheets

(56) References Cited

U.S. PATENT DOCUMENTS

| | | | |
|---|---|---|---|
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,534,609 B2 | 3/2003 | Mitchell et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,596,827 B2 * | 7/2003 | Kol et al. | 526/161 |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,750,302 B1 | 6/2004 | McDaniel et al. | |
| 6,833,338 B2 | 12/2004 | McDaniel et al. | |
| 6,833,415 B2 | 12/2004 | Kendrick et al. | |
| 6,838,533 B2 | 1/2005 | McDaniel et al. | |
| 6,887,819 B2 | 5/2005 | McDaniel et al. | |
| 7,064,225 B2 | 6/2006 | Thorn et al. | |
| 7,172,987 B2 * | 2/2007 | Kao et al. | 502/117 |
| 7,214,642 B2 | 5/2007 | McDaniel et al. | |
| 7,517,939 B2 | 4/2009 | Yang et al. | |
| 7,534,842 B2 | 5/2009 | Jayaratne et al. | |
| 7,576,163 B2 | 8/2009 | Yang et al. | |
| 7,803,629 B2 | 9/2010 | DesLauriers et al. | |
| 2005/0148744 A1 | 7/2005 | Kao | |
| 2005/0159300 A1 | 7/2005 | Jensen et al. | |
| 2007/0197374 A1 | 8/2007 | Yang et al. | |
| 2009/0118447 A1 * | 5/2009 | Razavi | 526/126 |
| 2010/0076167 A1 | 3/2010 | McDaniel et al. | |
| 2010/0227989 A1 | 9/2010 | Yang et al. | |
| 2013/0172498 A1 * | 7/2013 | Hlavinka et al. | 526/129 |

OTHER PUBLICATIONS

Hieber, C. A., et al., "Shear-rate-dependence modeling of polymer melt viscosity," Polymer Engineering and Science, Jul. 1992, vol. 32, No. 14, pp. 931-938.

Hawley's Condensed Chemical Dictionary, 11th ed., cover page, contents page, pp. 862-863, Van Nostrand Reinhold Company.

Li, Hongbo, et al., "Coordination copolymerization of severely encumbered isoalkenes with ethylene: enhanced enchainment mediated by binuclear catalysts and cocatalysts," Journal of the American Chemical Society, 2005, vol. 127, No. 42, pp. 14756-14768, American Chemical Society.

Thomas, J. M., "Sheet silicate intercalates: new agents for unusual chemical conversions," Intercalation Chemistry, 1982, chapter 3, pp. 55-99, Academic Press, Inc.

Janzen, J., et al., "Diagnosing long-chain branching in polyethylenes," Journal of Molecular Structure, 1999, vol. 485-486, pp. 569-584, Elsevier Science B. V.

Pinnavaia, Thomas J., "Intercalated clay catalysts," Science, New Series, Apr. 22, 1983, vol. 220, No. 4595, pp. 365-371, American Association for the Advancement of Science.

International Search Report, PCT/US2011/049633, dated Oct. 7, 2011.

Cotton, F. Albert, et al., Advanced Inorganic Chemistry, Mar. 30, 1999, 6th ed., cover page, title page, pp. ix-x and publishing information, John Wiley & Sons, Inc.

* cited by examiner

CATALYST SYSTEMS AND METHODS OF MAKING AND USING SAME

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

The present disclosure generally relates to catalyst systems. Particularly, the present disclosure relates to novel catalyst systems for production of polymer resins having improved shear-thinning properties.

FIELD OF THE INVENTION

Polyolefins are plastic materials useful for making a wide variety of valued products due to their combination of features such as stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass or metal. One of the most valued PE products is piping.

Polymeric pipes (e.g., PE pipes) have replaced metal pipes in many applications such as high-pressure fluid transportation. Polymeric pipes have several advantages over metal pipes including being of relatively lighter weight, more corrosion resistant, inexpensive, more thermally and electrically insulating, tougher, more durable and more easily shaped during manufacture. However, the manufacture of polymeric pipes of different sizes and shapes may be complicated by the characteristics of the resins employed for pipe production. Processability of a resin in polyethylene pipe manufacturing depends to some extent on the viscosity profile of the resin. For example, resins exhibiting lower zero-shear viscosities may experience issues with sag when manufacturing larger diameter pipes. Features such as the zero-shear viscosity of a polymeric material may be influenced, in large part, by the catalyst system employed in their production.

Thus, there exists an ongoing need for improved catalyst systems for the production of polymeric compositions having improved properties.

BRIEF SUMMARY OF THE INVENTION

Disclosed herein is a catalyst composition comprising (a) a first metallocene complex represented by the general formula:

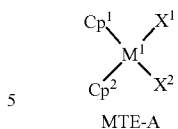

MTE-A where $M^1$ is Ti, Zr or Hf, $X^1$ and $X^2$ are each independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$ wherein R'' may be an alkyl group having up to 12 carbon atoms or an aryl group having up to 12 carbon atoms, and $Cp^1$ and $Cp^2$ are each independently a substituted or unsubstituted cyclopentadienyl group, or a substituted or unsubstituted indenyl group, where any substituent on $Cp^1$ and $Cp^2$ is H, a hydrocarbyl group having up to 18 carbon atoms or a hydrocarbylsilyl group having up to 18 carbon atoms, (b) a second metallocene complex, (c) a non-group 4 metallocene transition-metal complex, (d) an activator or activator-support, and (e) an optional cocatalyst.

DETAILED DESCRIPTION OF THE INVENTION

Figure 1A:
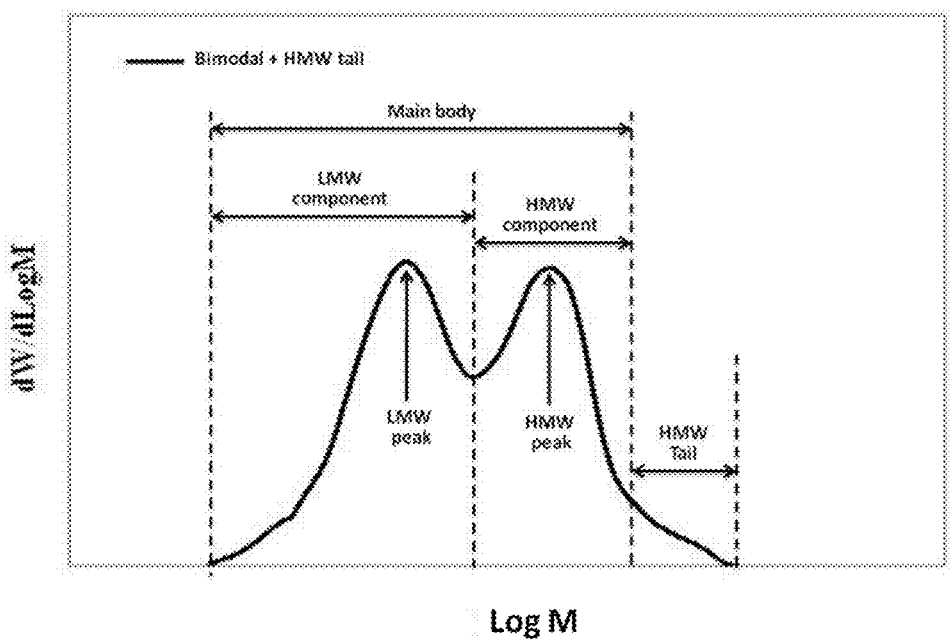
FIGS. 1a and 1b are graphical representations of molecular weight distribution profiles for normal bimodal resins and the polymeric compositions of this disclosure.

Disclosed herein are novel catalyst systems and methods of making and using same. In an embodiment, the catalyst system comprises at least two metallocenes, a non-group 4 metallocene transition-metal complex, an activator or an activator-support, and an optional cocatalyst. Catalyst systems of this type are hereinafter termed catalyst systems for producing high shear-thinning resins and designated POLCAT. These POLCATs may be used to produce polymer compositions that display improved shear-thinning properties which are hereinafter referred to as polymeric compositions having enhanced shear-thinning properties and designated EPC. Such catalyst systems (i.e., POLCATs), polymeric compositions (i.e., EPCs) and methods of making and using same are described in more detail herein.

In an embodiment, a method of preparing an EPC comprises contacting an alpha-olefin monomer with a POLCAT under conditions suitable for the formation of a polymer of the type described herein. In an embodiment, the POLCAT comprises at least two metallocenes, a non-group 4 metallocene transition-metal complex, an activator or activator-support, and an optional cocatalyst, each of which is described in more detail later herein. The terms "catalyst composition," "catalyst mixture," "catalyst system," and the like, do not depend upon the actual product resulting from the contact or reaction of the components of the mixtures, the nature of the active catalytic site, or the fate of the co-catalyst, the transition-metal complex, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, the POLCAT comprises a first metallocene compound hereinafter designated MTE-A. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, MTE-A comprises a metallocene compound which, when utilized as an ethylene polymerization catalyst in the presence of hydrogen, produces low molecular weight PE. Herein, low molecular weight PE refers to PE having a number average molecular weight ($M_n$) of from about 5,000 Daltons to about 50,000 Daltons, alternatively from about 8,000 Daltons to about 30,000 Daltons, alternatively from about 10,000 Daltons to about 20,000 Daltons. In an embodiment, MTE-A can be represented by the general formula:

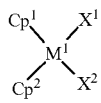

MTE-A where $M^1$ is Ti, Zr, or Hf;
$X^1$ and $X^2$ are each independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$, wherein R'' may be an alkyl group having up to 12 carbon atoms or an aryl group having up to 12 carbon atoms; and $Cp^1$ and $Cp^2$ are each independently a substituted or unsubstituted cyclopentadienyl group, or a substituted or unsubstituted indenyl group, where any substituent on $Cp^1$ and $Cp^2$ is H, a hydrocarbyl group having up to 18 carbon atoms or a hydrocarbylsilyl group having up to 18 carbon atoms.

In an embodiment, MTE-A is a dinuclear compound wherein each metal moiety has the same structural characteristic described previously herein. In an embodiment, MTE-A is a nonbridged metallocene. Nonlimiting examples of compounds suitable for use in this disclosure as MTE-A are represented by structures (1)-(13):

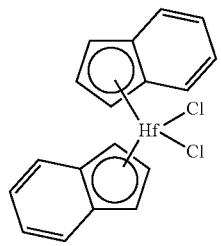

(1)

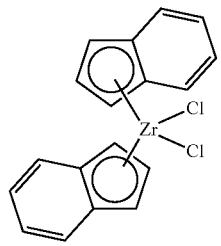

(2)

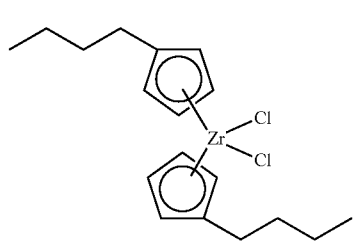

(3)

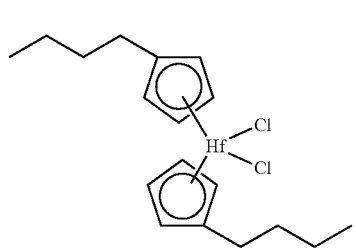

(4)

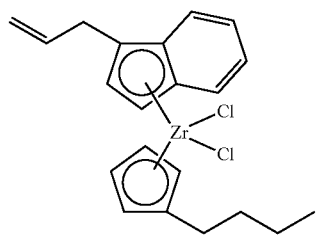

(5)

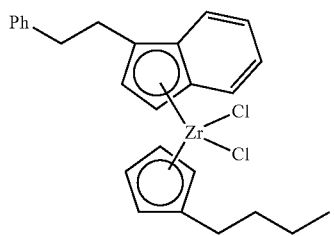

(6)

-continued (7)
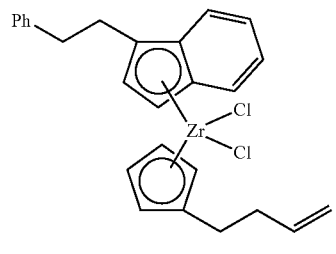

(8)
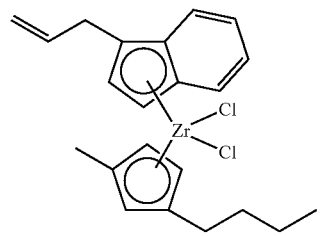

(9)
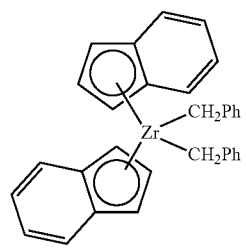

(10)
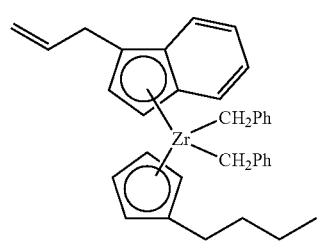

(11)
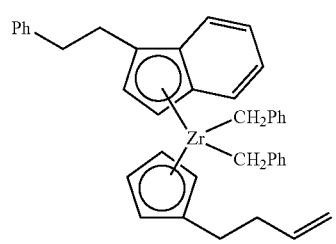

(12)
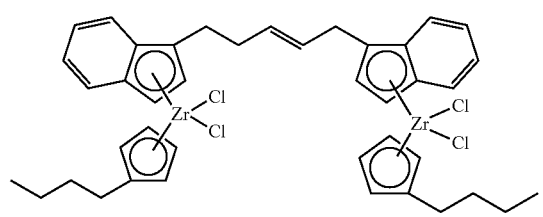

-continued

(13)
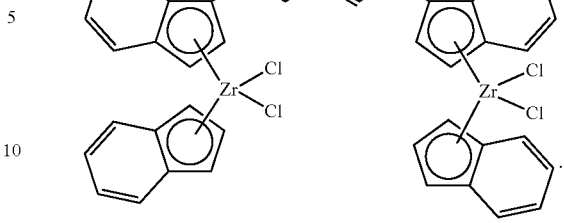

Other nonlimiting examples of metallocene compounds that may be suitably employed as MTE-A in a POLCAT for preparation of an EPC include bis(cyclopentadienyl)hafnium dichloride; bis(n-butylcyclopentadienyl)bis(di-t-butylamido)hafnium; bis(n-propylcyclopentadienyl)zirconium dichloride; bis(pentamethylcyclopentadienyl)zirconium dichloride; bis(1-propylindenyl)zirconium dichloride; or any combination thereof. In an embodiment, MTE-A comprises bis(indenyl)zirconium dichloride, alternatively MTE-A comprises the compound represented by structure (2). Hereinafter, the disclosure will refer predominately to the use of bis(indenyl)zirconium dichloride as MTE-A or the compound represented by structure (2) as MTE-A, although other metallocenes of the types described herein are also contemplated for use in the teachings of this disclosure.

In an embodiment, MTE-A is present in the catalyst system (i.e., POLCAT) in an amount of from about 0.01 weight percent (wt. %) to about 20 wt. %, alternatively from about 0.01 wt. % to about 10 wt. %, alternatively from about 0.01 wt. % to about 5 wt. % based on the total weight of POLCAT.

In an embodiment, the POLCAT comprises a second metallocene compound hereinafter designated MTE-B. An MTE-B suitable for use in this disclosure may comprise a metallocene compound which when utilized as an ethylene polymerization catalyst produces high molecular weight PE. Herein, a high molecular weight PE refers to a PE having a weight average molecular weight of from about 200,000 Daltons to about 1,200,000 Daltons, alternatively, from about 250,000 Daltons to about 1,000,000 Daltons, alternatively, from about 300,000 Daltons to about 800,000 Daltons. MTE-B may be characterized by the ability to function as a catalyst for the production of an ethylene copolymer having a high degree of incorporation of the comonomer. In an embodiment, MTE-B is a bridged metallocene.

In an embodiment, MTE-B can be represented by the general formula:

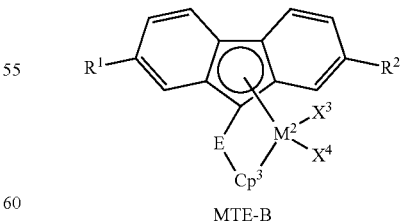

MTE-B where $M^2$ is Ti, Zr or Hf; $X^3$ and $X^4$ are independently F, Cl, Br, I, methyl, phenyl, benzyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, or $SO_3R''$ wherein $R''$ may be an alkyl group having up to 12 carbon atoms or an aryl group having up to 12 carbon atoms; $R^1$ and $R^2$ are independently hydrogen or a hydrocarbyl group having up to 18 carbon atoms; $Cp^3$ is a substituted or unsubstituted cyclopentadienyl group, a substituted or unsubstituted indenyl group, a substituted or unsubstituted fluorenyl group, where any substituent on $Cp^3$ is H, a hydrocarbyl group having up to 18 carbon atoms or a hydrocarbylsilyl group having up to 18 carbon atoms; and E represents a bridging group which may comprise (i) a cyclic or heterocyclic moiety having up to 18 carbon atoms, (ii) a group represented by the general formula $E^4R^{3A}R^{4A}$, wherein $E^4$ is C or Si, and $R^{3A}$ and $R^{4A}$ are independently H or a hydrocarbyl group having up to 18 carbon atoms, (iii) a group represented by the general formula $-CR^{3B}R^{4B}-CR^{3C}R^{4C}-$, wherein $R^{3B}$, $R^{4B}$, $R^{3C}$, and $R^{4C}$ are independently H or a hydrocarbyl group having up to 10 carbon atoms, (iv) a group represented by the general formula $-SiR^{3D}R^{4D}-SiR^{3E}R^{4E}-$, wherein $R^{3D}$, $R^{4D}$, $R^{3E}$, and $R^{4E}$ are independently H or a hydrocarbyl group having up to 10 carbon atoms, and wherein at least one of $R^{3A}$, $R^{3B}$, $R^{4A}$, $R^{4B}$, $R^{3C}$, $R^{4C}$, $R^{3D}$, $R^{4D}$, $R^{3E}$, $R^{4E}$, or the substituent on $Cp^3$ is (1) a terminal alkenyl group having up to 12 carbon atoms or (2) a dinuclear compound wherein each metal moiety has the same structural characteristic as MTE-B. Nonlimiting examples of compounds suitable for use in this disclosure as MTE-B are represented by structures (14)-(29):

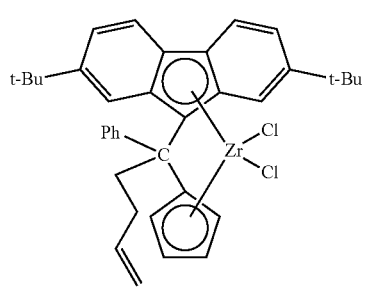
(14)

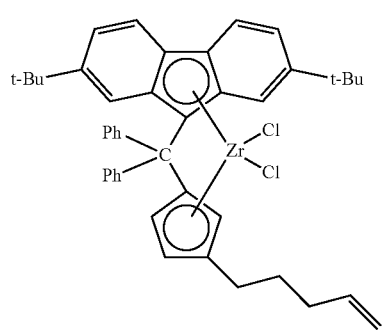
(15)

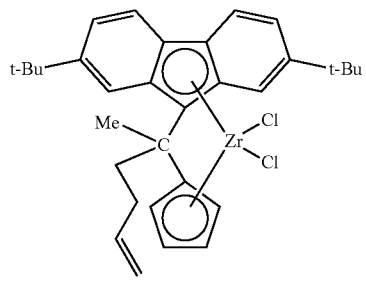
(16)

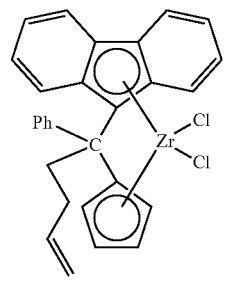
(17)

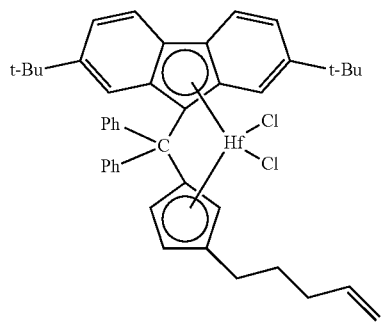
(18)

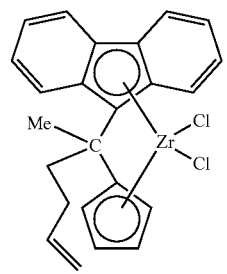
(19)

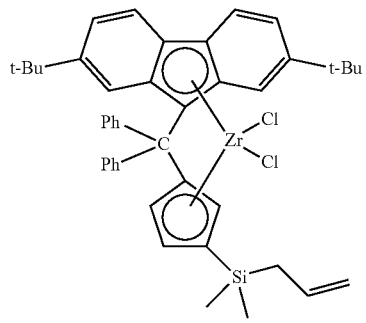
(20)

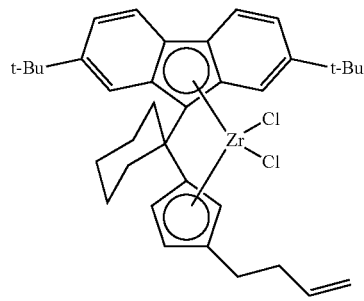
(21)

(22)
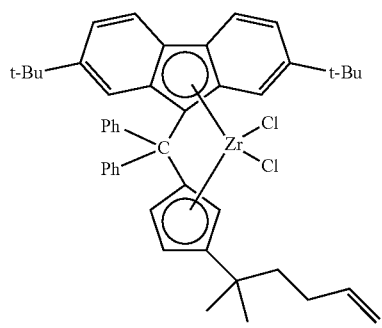
(23)
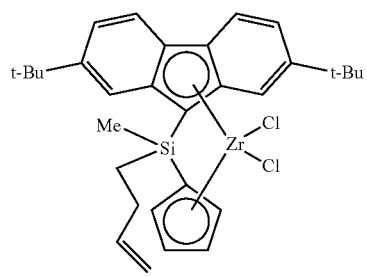
(24)
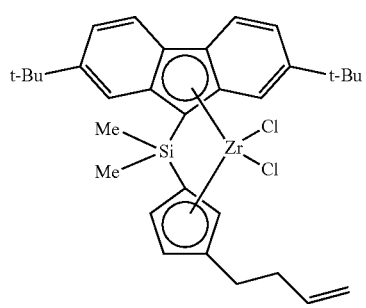
(25)
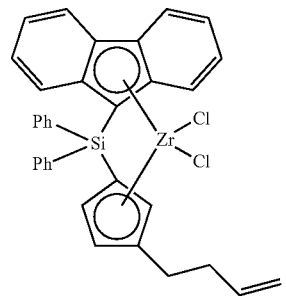
(26)
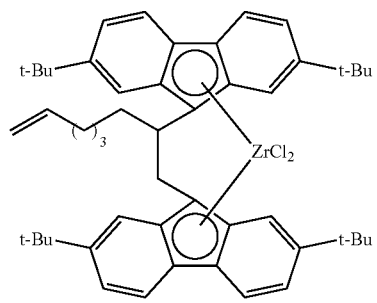
(27)
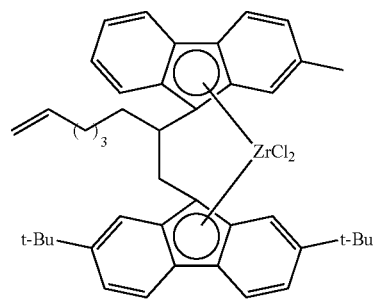
(28)
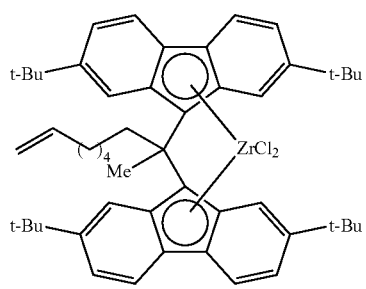
(29)
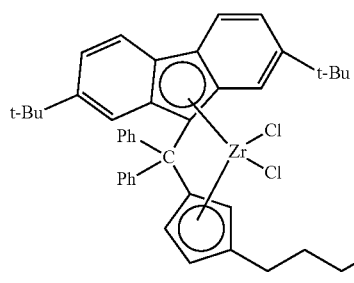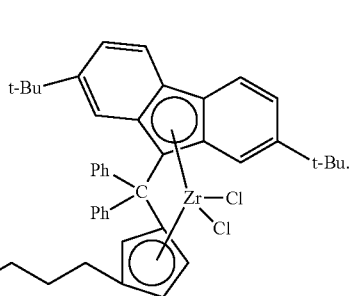

In an embodiment, MTE-B is a metallocene compound of the type described herein that produces high molecular weight PE and incorporates a comonomer well. In an embodiment, MTE-B is a compound represented by structures (15), (16), or (18).

In an embodiment, MTE-B is present in the catalyst system (i.e., POLCAT) in an amount of from about 0.01 wt. % to about 20 wt. %, alternatively from about 0.01 wt. % to about 10 wt. %, alternatively from about 0.01 wt. % to about 5 wt. % based on the total weight of the POLCAT.

In an embodiment, the POLCAT comprises a non-group 4 metallocene transition-metal complex hereinafter designated CAT-3. Herein the term "non group 4 metallocene transition metal complex" refers to metallocene complexes that exclude a group 4 transition-metal. It is contemplated that CAT 3 excludes metallocene complexes comprising a group 4 transition metal. CAT-3 may be any suitable non-group 4 metallocene transition-metal complex compatible with the other components of the POLCAT and able to function with the other components of the POLCAT to produce a polymeric material of the type described herein. In an embodiment, CAT-3 can be represented by general formula I or II:

  Formula I

  Formula II where y+z=valence of the metal, R is a hydrocarbon group having up to 12 carbon atoms and M is titanium, vanadium, zirconium, hafnium, chromium, molybdenum, tungsten, iron, cobalt, nickel, copper, or a lanthanides complex. Non-limiting examples of compounds suitable for use as CAT-3 in this disclosure include $TiCl_4$, $Zr(CH_2Ph)_4$, $Hf(CH_2Ph)_4$, $Zr(NMe_2)_4$, $CrCl_3$, $VCl_5$, $Ti(OBu)Cl_3$, $Ti(OBu)_3Cl$, $Ti(O-i-Pr)_2Cl_2$, $VOCl_3$, $Cp_2Cr$ where Cp is a cyclopentadienyl group, $(EtCp)_2Cr$, $CpCr(Py)Me_2$, $CpCr(Py)Cl_2$ and compounds represented by structures (30)-(33), where Bn is benzyl:

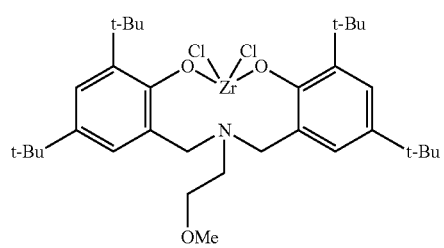
(30)

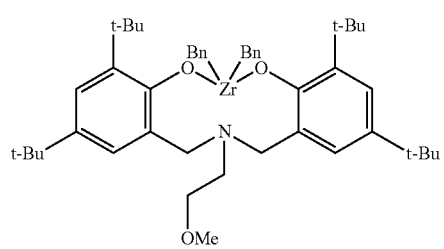
(31)

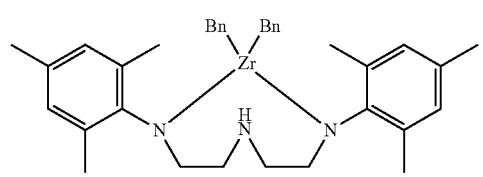
(32)

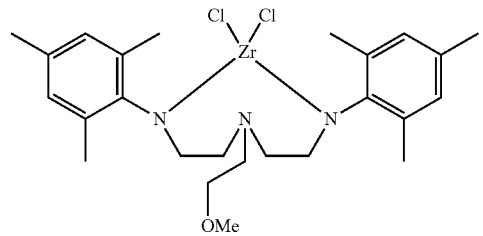
(33)

In an embodiment, CAT-3 is present in the catalyst system (i.e., POLCAT) in an amount of from about 0.01 wt. % to about 5 wt. %, alternatively from about 0.01 wt. % to about 3 wt. %, alternatively, from about 0.01 wt. % to about 1 wt. % based on the total weight of POLCAT.

The present disclosure encompasses various catalyst compositions containing an activator, which can be an activator-support. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene(s) in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 to about 1000 m$^2$/g. In yet another aspect, the solid oxide has a surface area of from about 200 to about 800 m$^2$/g. In still another aspect of the present disclosure, the solid oxide has a surface area of from about 250 to about 600 m$^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or of the periodic table, or comprising oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Patent Publication No. 2010-0076167, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions of the present disclosure (e.g., POLCAT) can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, H$^+$, [H(OEt$_2$)$_2$]$^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302, the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present disclosure, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining Silicon tetrafluoride ($SiF_4$) and compounds containing tetrafluoroborate ($BF_4^-$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 $m^2$/g. According to another aspect of this disclosure, the surface area is greater than about 250 $m^2$/g. Yet, in another aspect, the surface area is greater than about 350 $m^2$/g.

The silica-alumina utilized in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present disclosure, one or more of the metallocene compounds can be precontacted with an olefin monomer and an organoaluminum compound for a first period of time prior to contacting this mixture with the activator-support. Once the precontacted mixture of the metallocene compound(s), olefin monomer, and organoaluminum compound is contacted with the activator-support, the composition further comprising the activator-support is termed a "postcontacted" mixture. The postcontacted mixture can be allowed to remain in further contact for a second period of time prior to being charged into the reactor in which the polymerization process will be carried out.

According to yet another aspect of the present disclosure, one or more of the metallocene compounds can be precontacted with an olefin monomer and an activator-support for a first period of time prior to contacting this mixture with the organoaluminum compound. Once the precontacted mixture of the metallocene compound(s), olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor.

In an embodiment, the activator or activator-support is present in the catalyst system (i.e., POLCAT) in an amount of from about 1 wt. % to about 90 wt. %, alternatively from about 5 wt. % to about 90 wt. %, alternatively from about 10 wt. % to about 90 wt. % based on the total weight of POLCAT.

A POLCAT may further comprise a cocatalyst. In an embodiment, the cocatalyst comprises an organoaluminum compound, alternatively an alkylaluminum compound. For example, the cocatalyst may comprise a trialkylaluminum compound, having the general formula $AlR_3$. Nonlimiting examples of trialkylaluminum compounds suitable for use in this disclosure include triisobutylaluminum (TiBA or TiBAl); tri-n-butylaluminum (TNBA); tri-octly-butylaluminum (TOBA); triethylaluminum (TEA); and/or other appropriate alkyl-aluminum complexes, and combinations thereof. Additionally, partially hydrolyzed alkylaluminum compounds and/or aluminoxanes, may be used. In an embodiment, the cocatalyst comprises a compound represented by the general formula:

$$Al(X^5)_p(X^6)_q$$

where $X^5$ is a halide, hydrocarbyloxide group, hydrocarbylamino group or combinations thereof; $X^6$ is a hydrocarbyl group having up to 18 carbon atom; p ranges from 0 to 2; and q is 3−p In an embodiment, the cocatalyst is present in the catalyst system (i.e., POLCAT) in an amount of from about 0.05 wt. % to about 80 wt. %, alternatively from about 0.05 wt. % to about 60 wt. %, alternatively from about 0.05 wt. % to about 40 wt. % based on the total weight of POLCAT.

In an embodiment, the POLCAT comprises an optional additional activator. In an embodiment, the additional activator comprises an aluminoxane compound. As used herein, the term "aluminoxane" refers to aluminoxane compounds, compositions, mixtures, or discrete species, regardless of how such aluminoxanes are prepared, formed or otherwise provided. Aluminoxanes are also referred to as poly(hydrocarbyl aluminum oxides) or organoaluminoxanes.

The aluminoxane compound of this disclosure can be an oligomeric aluminum compound comprising linear structures, cyclic structures, or cage structures, or mixtures of all three. Cyclic aluminoxane compounds having the formula:

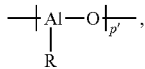

wherein each R is independently a linear or branched alkyl having from 1 to 10 carbon atoms, and p' ranges from 3 to 20 are encompassed by this disclosure. The AlRO moiety shown here also constitutes the repeating unit in a linear aluminoxane. Thus, linear aluminoxanes having the formula:

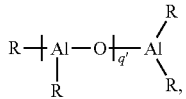

wherein R is a linear or branched alkyl having from 1 to 10 carbon atoms and, q' is an integer from 1 to 50, are also encompassed by this disclosure. Further, aluminoxanes suitable for use in this disclosure can have cage structures of the formula $R'_{5r+\alpha}R^b_{r-\alpha}Al_{4r}O_{3r}$, wherein $R'$ is a terminal linear or branched alkyl group having from 1 to 10 carbon atoms; $R^b$ is a bridging linear or branched alkyl group having from 1 to 10 carbon atoms; r is 3 or 4; and α is equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

In an embodiment, aluminoxanes which can be employed as additional activators in the catalyst compositions of the present disclosure (i.e., POLCAT) are represented generally by formulas such as $(R-Al-O)_{p'}$, $R(R-Al-O)_{q'}AlR_2$, and the like. In these formulas, each R group is typically a linear or branched $C_1$-$C_6$ alkyl, such as methyl, ethyl, propyl, butyl, pentyl, or hexyl. Examples of aluminoxane compounds that can be used in accordance with the present disclosure include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentyl-aluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the disclosure to use an aluminoxane in combination with a trialkylaluminum, such as that disclosed in U.S. Pat. No. 4,794,096, incorporated herein by reference in its entirety.

The present disclosure contemplates many values of p' and q' in the aluminoxane formulas $(R-Al-O)_{p'}$, and $R(R-Al-O)_{q'}AlR_2$, respectively. In some aspects, p' and q' are at least 3. However, depending upon how the organoaluminoxane is prepared, stored, and used, the value of p' and q' can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of transition-metal complex in the composition is generally between about 1:10 and about 100,000:1; alternatively, in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

In an embodiment, the additional activator comprises comprise an organoboron compound or an organoborate compound. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present disclosure. Examples of fluoroorgano borate compounds that can be used in the present disclosure include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, or mixtures thereof. Examples of fluoroorgano boron compounds that can be used in the present disclosure include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this disclosure, the molar ratio of the total moles of organoboron or organoborate compound (or compounds) to the total moles of metallocene compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of transition-metal complex. According to another aspect of this disclosure, the amount of fluoroorgano boron or fluoroorgano borate compound is from about 0.8 moles to about 5 moles of boron/borate compound per mole of transition-metal complex. In an embodiment, the additional activator comprises (MAO), modified methylaluminoxane (MMAO) or combinations thereof. These activators are described in more detail in U.S. Pat. Nos. 5,565,592, 5,399,636 and 6,534,609 each of which is incorporated by reference herein in its entirety.

In an embodiment, the optional activator is present in the catalyst system (i.e., POLCAT) in an amount of from about 0.1 wt. % to about 40 wt. %, alternatively from about 0.1 wt. % to about 30 wt. %, alternatively from about 0.1 wt. % to about 20 wt. % based on the weight of POLCAT.

Any suitable methodology for the formulation of a POLCAT comprising at least the aforementioned components may be employed. One methodology may involve contacting the individual components of the POLCAT to form a mixture which can then be introduced to a reactor or reactor zone where the mixture functions to catalyze polymerization of an olefin.

Alternatively, the individual components of the POLCAT may be independently introduced to a reactor or reactor zone where they may contact and form a mixture that functions to catalyze polymerization of an olefin. In some embodiments, at least two of the components of the POLCAT are contacted prior to introduction of the POLCAT to a reactor or reactor zone. For example, CAT-3 may be pre-supported onto an activator-support in slurry form or dry form. Alternatively, CAT-3 may be contacted, for example in a precontactor, with MTE-A, MTE-B, the cocatalyst and activator-support to form a mixture which is subsequently introduced to a reactor or reactor zone. Alternatively, CAT-3, MTE-A, MTE-B, the cocatalyst and activator-support are independently introduced to a reactor or reactor zone and contacted with the remaining components of the POLCAT. Alternatively, the POLCAT is formed by a method comprising combining MTE-A and MTE-B to form mixture A. The method may further comprise contacting CAT-3 and an activator-support to form mixture B. The method may further comprise feeding mixtures A, B, and the cocatalyst to a precontactor to form the POLCAT which is subsequently introduced to a reactor or reactor zone where the POLCAT functions to catalyze polymerization of an olefin. In an embodiment, an optional activator is contacted with the other components of the POLCAT prior to the POLCAT functioning as a catalyst in a polymerization reaction.

In an embodiment, the relative ratios of each of the aforementioned components comprising the POLCAT may be such that the amounts of each component fall within the previously disclosed ranges. In an embodiment, the amounts of each component are chosen to provide a weight ratio of MTE-A to MTE-B of from about 1:100 to about 100:1, alternatively from about 1:50 to about 50:1, alternatively, from about 1:25 to about 25:1. In an embodiment, the amounts of each component are chosen to provide a weight ratio of total metallocene complexes (sum of the amount of MTE-A and MTE-B) to activator-support of from about 1:10000 to about 1:1, alternatively from about 1:1000 to about 1:2, alternatively, from about 1:1000 to about 1:10. In an embodiment, the amounts of each component are chosen to provide a weight ratio of CAT-3 to activator-support in the range of from about 1:10000 to 1:10, alternatively from about 1:10000 to about 1:20, alternatively from about 1:10000 to about 1:30. In an embodiment, the amounts of each component are chosen to provide a weight ratio of cocatalyst to activator-support in the range of from about 1:1000 to about 10:1, alternatively from about 1:100 to abut 1:1, alternatively from about 1:100 to about 1:2.

In an embodiment, a POLCAT of the type described herein comprises from about 0.01 wt. % to about 5 wt. % MTE-A, from about 0.01 wt. % to about 5 wt. % MTE-B, from about 0.01 wt. % to about 1 wt. % CAT-3, from about 10 wt. % to about 90 wt. % activator-support, from about 0.05 wt. % to about 40 wt. % cocatalyst and from about 0 wt. % to about 20 wt. % of an optional activator.

The POLCAT's disclosed herein are intended for use as catalysts in any olefin polymerization method which may be carried out using various types of polymerization reactors. As used herein, "polymerization reactor" includes any polymerization reactor capable of polymerizing olefin monomers to produce homopolymers or copolymers.

The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted co-monomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor comprising vertical and/or horizontal loops. Monomer, diluent, catalyst and optionally any co-monomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed remove the solid polymer from the liquids that comprise the diluent, monomer and/or co-monomer. Various technologies may be used for this separation step including but not limited to, flashing that may include any combination of heat addition and pressure reduction; separation by cyclonic action in either a cyclone or hydrocyclone or separation by centrifugation A typical slurry polymerization process (also known as the particle form process), is disclosed, for example, in U.S. Pat. Nos. 3,248,179; 4,501,885; 5,565,175; 5,575,979; 6,239,235; 6,262,191; and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide desired resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, and modifiers are important in producing these resin properties. Co-monomer is used to control product density. Hydrogen can be used to control product molecular weight. Modifiers can be used to control product properties. In addition, the concentration of poisons is minimized because poisons impact the reactions and product properties. In an embodiment, hydrogen is added to the reactor during polymerization. Alternatively, hydrogen is not added to the reactor during polymerization.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, injection molding, fiber spinning, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts and catalyst system (i.e., POLCAT's) prepared in accordance with the present disclosure may be used for the polymerization of olefins, for example, alpha-olefins. In an embodiment, a POLCAT of the type described herein is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene, or the like. Such alpha-olefins may be used individually (e.g., to produce homopolymers) or in various combinations of two or more to produce co-polymers (e.g., di-polymers, tri-polymers, etc.). In an embodiment, the POLCAT described herein is used to produce polyethylene, for example polyethylene homopolymer or co-polymer. In various embodiments, ethylene is used with one or more co-monomers such as 1-octene, 1-hexene, 1-butene, and the like.

In an embodiment, the POLCATs disclosed herein are used for the production of a EPC comprising a polyethylene polymer. The individual components of the EPC may comprise a homopolymer.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

It is to be understood in the disclosure that follows where features of the individual components are disclosed, determination of these features were carried out on a single component independent of the contribution of the other component. For example, a first component may be recovered and its technical features analyzed prior to contacting with a second component.

An EPC of the type described herein may be a multimodal resin. Herein, the "modality" of a polymer resin refers to the form of its molecular weight distribution curve, i.e., the appearance of the graph of the polymer weight fraction as a function of its molecular weight, as may be displayed by, for example, gel permeation chromatography (GPC). The polymer weight fraction refers to the weight fraction of molecules of a given size. A polymer having a molecular weight distribution curve showing a single peak may be referred to as a unimodal polymer, a polymer having a curve showing two distinct peaks may be referred to as bimodal or a bimodal-like polymer, a polymer having a curve showing three distinct peaks may be referred to as trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer or polymers.

Figure 1B:
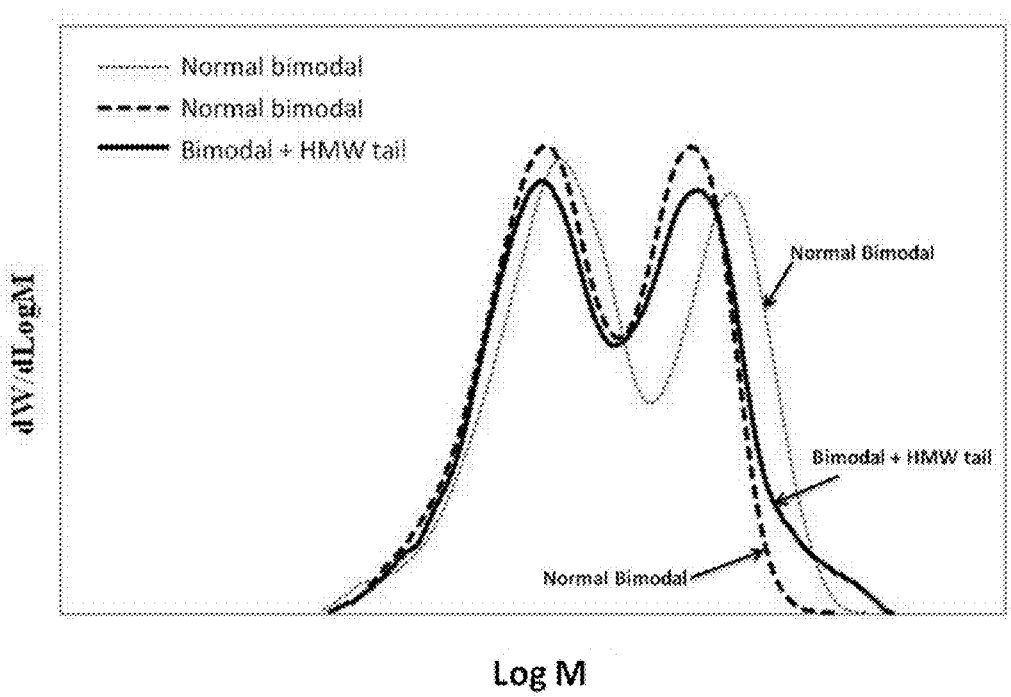

In an embodiment, the EPC is characterized as a bimodal-like resin. Such a bimodal-like resin may show two distinct peaks in a GPC profile, but is different from the conventional bimodal resins. A GPC of an EPC of the type described herein displays at least three identifiable features comprising two peaks attributable to a higher molecular weight (HMW) component and a lower molecular weight (LMW) component and an additional feature that is located upfield of the peak attributable to the HMW component. Hereinafter, the individual components of the EPC will be designated Component A and Component B where Component A refers to the "main body" of the GPC profile which displays two distinctive peaks attributable to a HMW component and a LMW component and Component B refers to the HMW "tail." This is graphically illustrated in FIG. 1a which gives the molecular weight distribution profile of a bimodal-like polymer resin of the type described herein (e.g., EPC) having as indicated a HMW component, a LMW component and a higher molecular weight tail. FIG. 1b is a comparative of the GPC profiles of two "normal" bimodal resins having a HMW and LMW component to the bimodal-like resin of the type described herein (i.e., EPC) having an additional HMW tail.

In an embodiment, Component A is present in the EPC in an amount ranging from about 80 weight percent (wt. %) to about 99.9 wt. %, alternatively from about 90 wt. % to about 99.5 wt. %, alternatively from about 95 wt. % to about 99 wt. %. In an embodiment, Component B is present in the EPC in an amount ranging from about 0.1 wt. % to about 20 wt. %, alternatively from about 0.5 wt. % to about 10 wt. %, alternatively from about 1 wt. % to about 5 wt. %. The individual components of the polymer composition can be obtained by deconvoluting the GPC of the polymer as described in U.S. Patent Publication No. 20070298508 which is incorporated by reference herein in its entirety.

In an embodiment, Component B of the EPC has a weight average molecular weight ($M_w$) of greater than about $2 \times 10^6$ Daltons, alternatively greater than about $2.5 \times 10^6$ Daltons, alternatively greater than about $3 \times 10^6$ Daltons. The weight average molecular weight describes the molecular weight distribution of a polymer composition and is calculated according to equation 1:

$$\overline{M}_w = \frac{\sum_i N_i M_i^2}{\sum_i N_i M_i} \quad (1)$$

where $N_i$ is the number of molecules of molecular weight $M_i$. All molecular weight averages are expressed in gram per mole (g/mol) or Daltons and are determined by gel permeation chromatography. The number average molecular weight is the common average of the molecular weights of the individual polymers calculated by measuring the molecular weight of n polymer molecules, summing the weights, and dividing by n.

$$\overline{M}_n = \frac{\sum_i N_i M_i}{\sum_i N_i} \quad (2)$$

The z-average molecular weight is a higher order molecular weight average which is calculated according to equation (3)

$$M_z = \Sigma n_i M_i^3 / \Sigma n_i M_i^2 \ (\text{kg mol}^{-1}) \quad (3)$$

where $n_i$ is the amount of substance of species i and $M_i$ is the molar mass of species.

Component A of the EPC may further be characterized by a molecular weight distribution (MWD) of from about 5 to about 60, alternatively from about 5 to about 50, alternatively from about 5 to about 40. The MWD refers to the ratio of the weight average molecular weight ($M_w$) to the number average molecular weight ($M_n$), which is also referred to as the polydispersity index (PDI) or more simply as polydispersity.

The EPC may further be characterized as having an $M_z/M_w$ of greater than about 4, alternatively greater than about 5, alternatively greater than about 5.5.

The EPC may be characterized by the degree of branching present in the individual components and/or in the composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene. The EPC may further be characterized as having a ratio of short-chain branching in the HMW component to short-chain branching in the LMW component (SCB@HMW Peak)/(SCB@LMW Peak) of greater than about 1, alternatively greater than about 1.5, alternatively greater than about 2.

Long chain branching (LCB) exerts its effects on polymer rheology. Component A of the EPC may contain equal to or less than about 0.01 long chain branch (LCB) per about 1,000 total carbon atoms, alternatively equal to or less than about 0.008 LCB per about 1,000 total carbon atoms, or alternatively equal to or less than about 0.005 LCB per about 1,000 total carbon atoms; wherein the LCB content of Component A is defined by JC alpha. JC alpha refers to a methodology for determining the LCB content in a polymer based on the model proposed by Janzen and Colby in the Journal of Molecular Structure, 485-486 (1999) pp. 569-584, the relevant portions of which are incorporated by reference herein.

The EPC may be characterized as having a density of from about 0.92 g/cc to about 0.96 g/cc, alternatively from about 0.93 g/cc to about 0.96 g/cc, alternatively from about 0.94 g/cc to about 0.96 g/cc as determined in accordance with ASTM D 1505.

The EPC may be characterized as having a high-load melt index (HLMI) of from about 0 g/10 min. to about 100 g/10 min., alternatively from about 0 g/10 min. to about 75 g/10 min., alternatively from about 0 g/10 min. to about 50 g/10 min, alternatively from about 0 g/10 min. to about 30 g/10 min. The HLMI refers to the amount of a polymer which can be forced through an extrusion rheometer orifice of 0.0825 inch diameter when subjected to a force of 21.6 kilograms in ten minutes at 190° C., as determined in accordance with ASTM D 1238.

The EPC may be characterized as having ratio of HLMI to MI of greater than about 20, alternatively greater than about 30, alternatively greater than about 40, alternatively greater than about 100, alternatively greater than about 200, alternatively greater than about 500. The melt index (MI) refers to the amount of a polymer which can be forced through an extrusion rheometer orifice of 0.0825 inch diameter when subjected to a force of 2.16 kilograms in ten minutes at 190° C., as determined in accordance with ASTM D 1238.

In an embodiment, an EPC of the type described herein has a zero shear viscosity ($E_o$), in the range of from about $10^5$ Pa·s to about $10^8$ Pa·s, alternatively from about $10^5$ Pa·s to about $10^7$ Pa·s, alternatively of from about $10^5$ Pa·s to about $8 \times 10^6$ Pa·s, alternatively from about $10^5$ Pa·s to about $5 \times 10^6$ Pa·s as determined in accordance with Carreau-Yasuda (CY) model, which is represented by equation (4):

$$E = E_o[1 + (T_\xi \dot{\gamma})^a]^{\frac{n-1}{a}} \quad (4)$$

where
E=viscosity (Pa·s)
$\dot{\gamma}$ shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant n is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987), each of which is incorporated by reference herein in its entirety.

The zero shear viscosity refers to the viscosity of the polymeric composition at a zero shear rate and is indicative of the materials molecular structure. Further, for polymer melts, the zero shear viscosity is often a useful indicator of processing attributes such as the melt strength of polymer melts in polymer processes. For example, the higher the zero shear viscosity, the better the melt strength, which may lead to larger diameter pipes that have a reduced amount of or no sag issues.

In an embodiment, an EPC of the type described herein has an Eta@0/Eta@1 ratio of greater than about 3.5, alternatively greater than about 3.8, alternatively greater than about 4. The Eta@0/Eta@1 ratio represents the ratio of the viscosity at zero shear rate to the viscosity at a shear rate equal to 1 $s^{-1}$.

EXAMPLES

Example 1

The activated sulfated alumina activator-support employed in making resins R2, R4 and R6 shown in Table 3 was prepared in accordance with the following procedure: Bohemite as a powder was obtained from W.R. Grace Company under the designation "Alumina A." Alumina A had a surface area of about 300 $m^2$/g, a pore volume of about 1.3 mL/g and an average particle size of about 100 microns. The material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina activator-support was collected and stored under dry nitrogen, and was used without exposure to the atmosphere.

Example 2

The Ti-containing sulfated alumina activator-support employed in making resins R3, R5 and R7 shown in Table 3 was prepared in accordance with the following procedure: To the activated sulfated alumina (9 g) slurried in a dry heptane (60 mL) was added a neat $TiCl_4$ (45 mg) dissolved in a dry heptane (10 mL) while stirring in a glove box. The mixture was stirred for an additional 3 minutes. The supernatant was then decanted. The solid was dried under vacuum at room temperature. The solid was used as an activator-support without any further activation.

Example 3

The polymerization runs were conducted in a one-gallon (3.8-liter) stainless steel reactor as follows. First, the reactor was purged with nitrogen and then with isobutane vapor. The desired amount of triisobutylaluminum (TIBA), activator-support and metallocene mixture of MTE-A and MTE-B, both of the type previously described herein, were added in that order through a charge port while venting isobutane vapor. The charge port was closed and 1.8 L of isobutane was added. The contents of the reactor were stirred and heated to a desired temperature. Then a desired amount of 1-hexene were added into the reactor, followed by the introduction of ethylene and hydrogen, with the hydrogen added at a fixed mass ratio with respect to the ethylene flow. Hydrogen was added with the ethylene via an automated feeding system, while the total reactor pressure was maintained at a desired pressure by the combined ethylene/hydrogen/isobutane/hexene addition. The reactor was maintained and controlled at the desired temperature throughout the desired run time of the polymerization. Upon completion, the isobutane and ethylene were vented from the reactor, the reactor was opened, and the polymer product was collected and dried.

Using the previously described methodology, the polymerization activity of compositions of the type described herein (e.g., POLCAT) were investigated. Comparative catalyst systems (Samples 2, 4, and 6) and POLCATs of the type described herein (Samples 3, 5, and 7) were prepared to contain the components in the amounts indicated in Table 1.

TABLE 1

| Sample No. | MTE-A | MTE-B | MTEA/MTE-B (mg/mg) | Activator-Support (150 mg) | TIBAL (mmol) |
|---|---|---|---|---|---|
| 2 | Compound 2* | Compound 16 | 1/0.7 | sulfated alumina | 0.5 |
| 3 | Compound 2 | Compound 16 | 1/0.7 | Ti-containing sulfated alumina | 0.5 |
| 4 | Compound 2 | Compound 15 | 1.75/0.2 | Sulfated alumina | 0.7 |
| 5 | Compound 2 | Compound 15 | 1.75/0.2 | Ti-containing sulfated alumina | 0.7 |

TABLE 1-continued

| Sample No. | MTE-A | MTE-B | MTEA/MTE-B (mg/mg) | Activator-Support (150 mg) | TIBAL (mmol) |
|---|---|---|---|---|---|
| 6 | Compound 2 | Compound 18 | 1/0.8 | Sulfated alumina | 0.5 |
| 7 | Compound 2 | Compound 18 | 1/0.8 | Ti-containing sulfated alumina | 0.5 |

*The compound numbers correspond to the structure numbers presented in the disclosure such that for example compound 2 refers to the compound represented by structure 2 in the specification.

The catalyst systems were used to polymerize ethylene in the presence or absence of a 1-hexene comonomer under the conditions summarized in Table 2 and produce polyethylene resins designated R2-R7.

TABLE 2

| Resin No. | 1-hexene (g) | $H_2/C_2$ (ppm) | Time (min.) | Temp. (° C.) | Pressure (psi) | Solid PE (g) |
|---|---|---|---|---|---|---|
| R2 | 0 | 350 | 30 | 95 | 420 | 271.0 |
| R3 | 8.0 | 350 | 30 | 95 | 420 | 213.0 |
| R4 | 8.0 | 350 | 30 | 92 | 400 | 169.0 |
| R5 | 8.0 | 350 | 30 | 92 | 400 | 176.0 |
| R6 | 8.0 | 350 | 45 | 95 | 420 | 224.0 |
| R7 | 8.0 | 350 | 45 | 95 | 420 | 191.0 |

Figure 2:
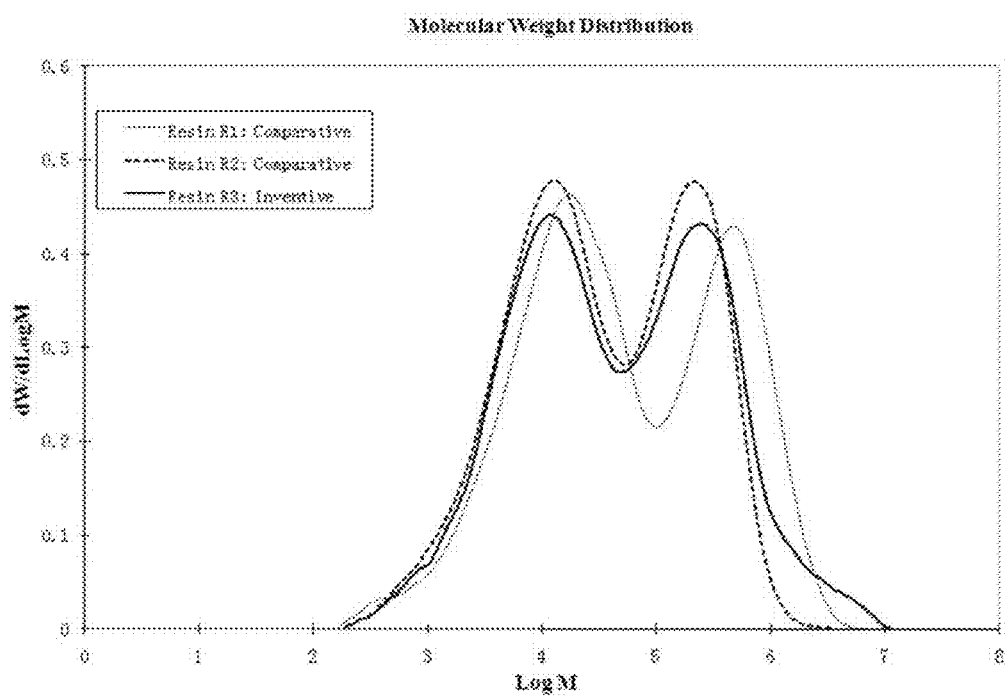
FIG. 2 is the molecular weight distribution profile of resins 1, 2, and 3 from Example 3.
Figure 3:
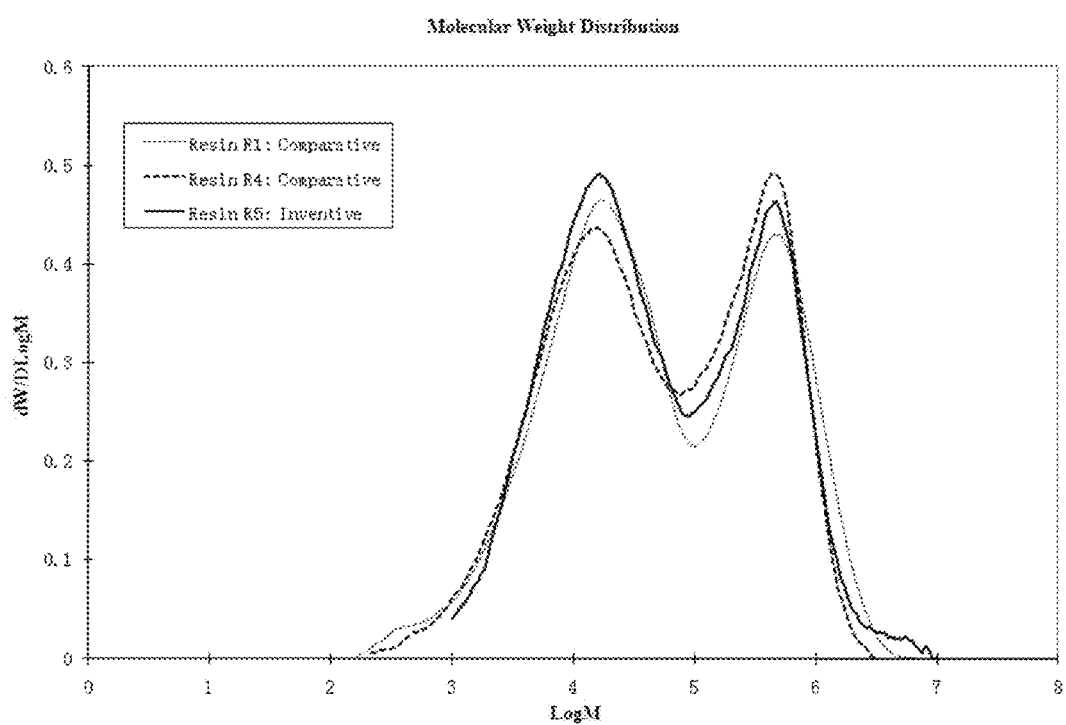
FIG. 3 is the molecular weight distribution profile of resins 1, 4, and 5 from Example 3.
Figure 4:
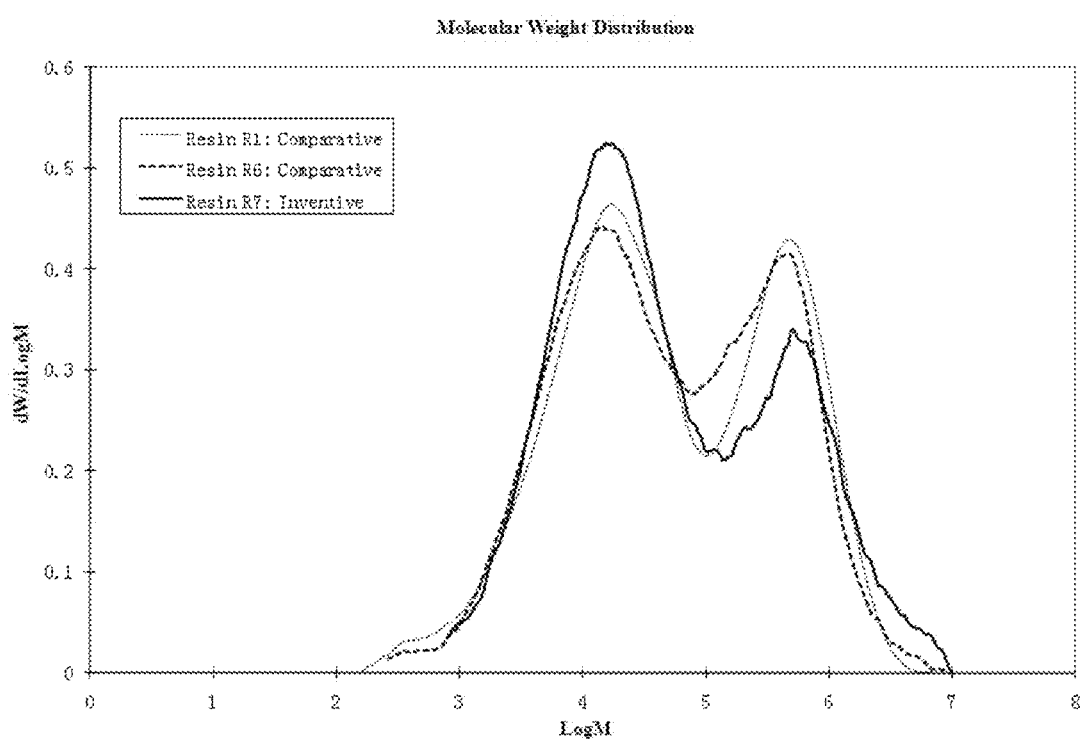
FIG. 4 is the molecular weight distribution profile of resins 1, 6, and 7 from Example 3.
Figure 5:
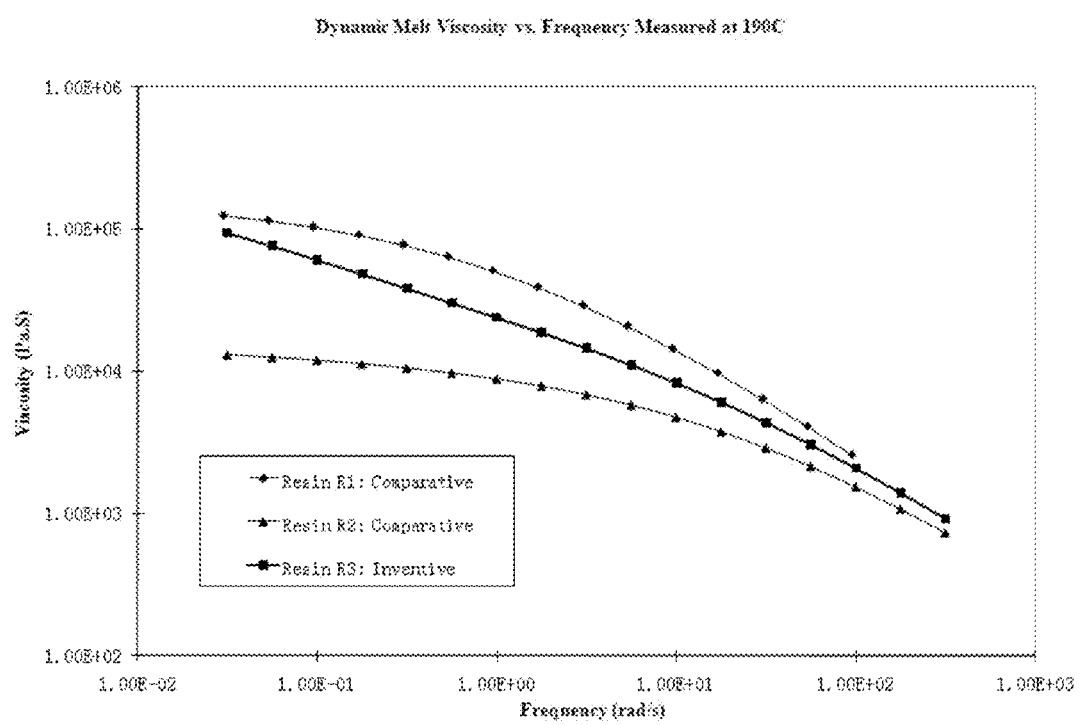
FIG. 5 is a plot of the dynamic melt viscosity as a function of frequency for resins 1, 2, and 3 from Example 3.
Figure 6:
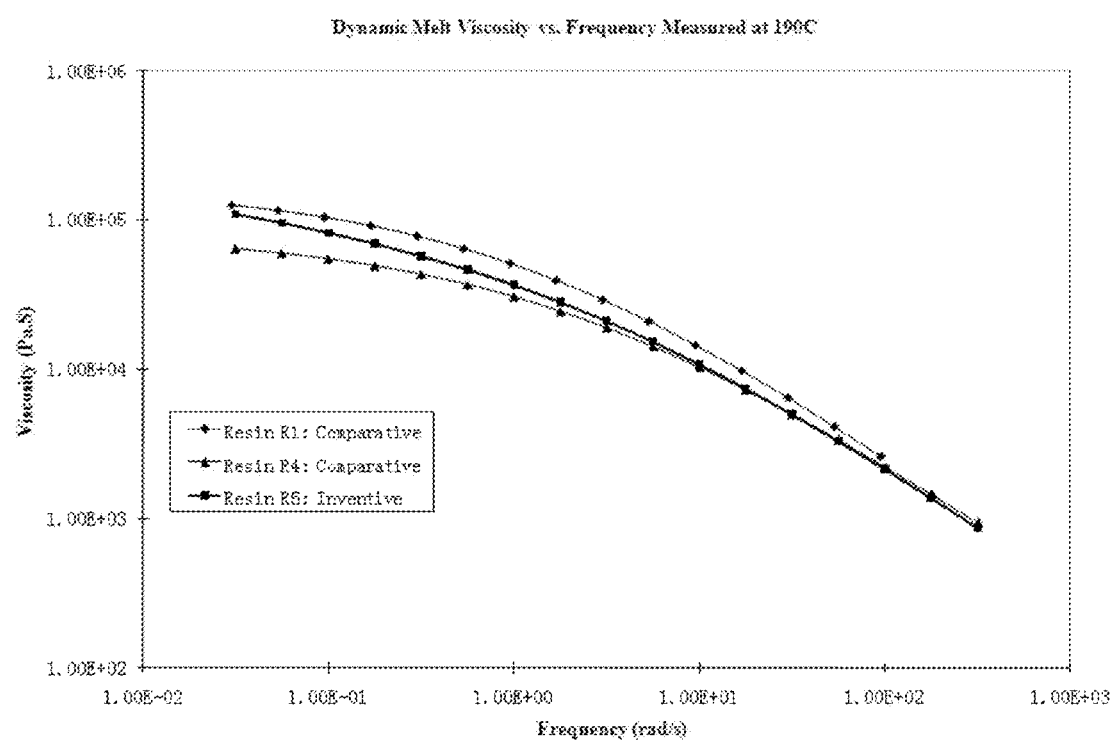
FIG. 6 is a plot of the dynamic melt viscosity as a function of frequency for resins 1, 4, and 5 from Example 3.
Figure 7:
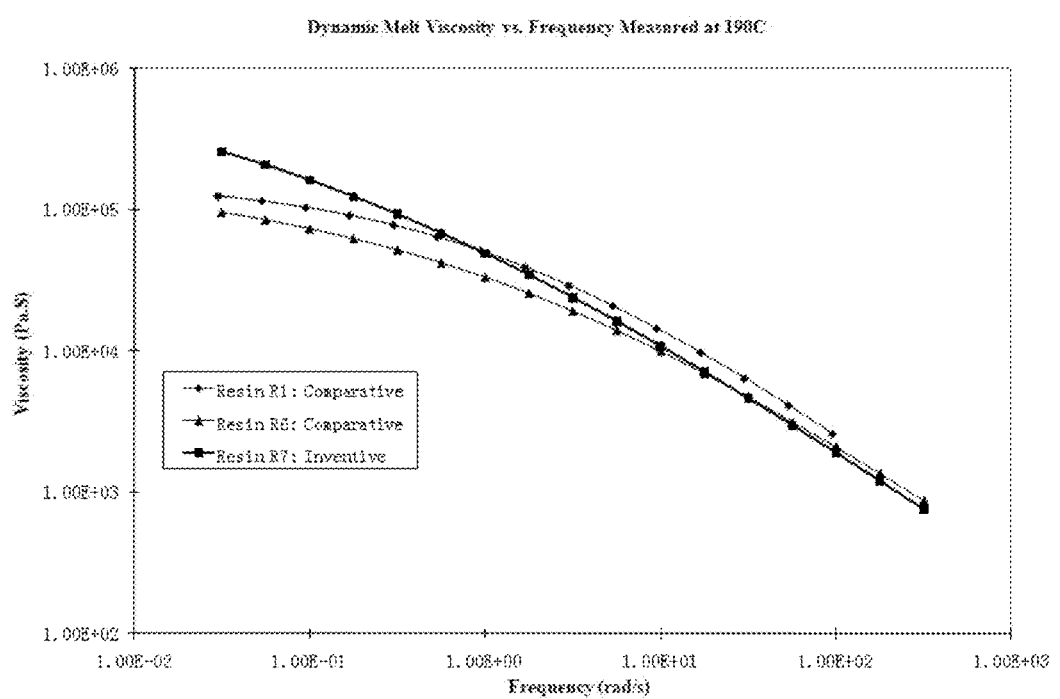
FIG. 7 is a plot of the dynamic melt viscosity as a function of frequency for resins 1, 6, and 7 from Example 3.
Figure 8:
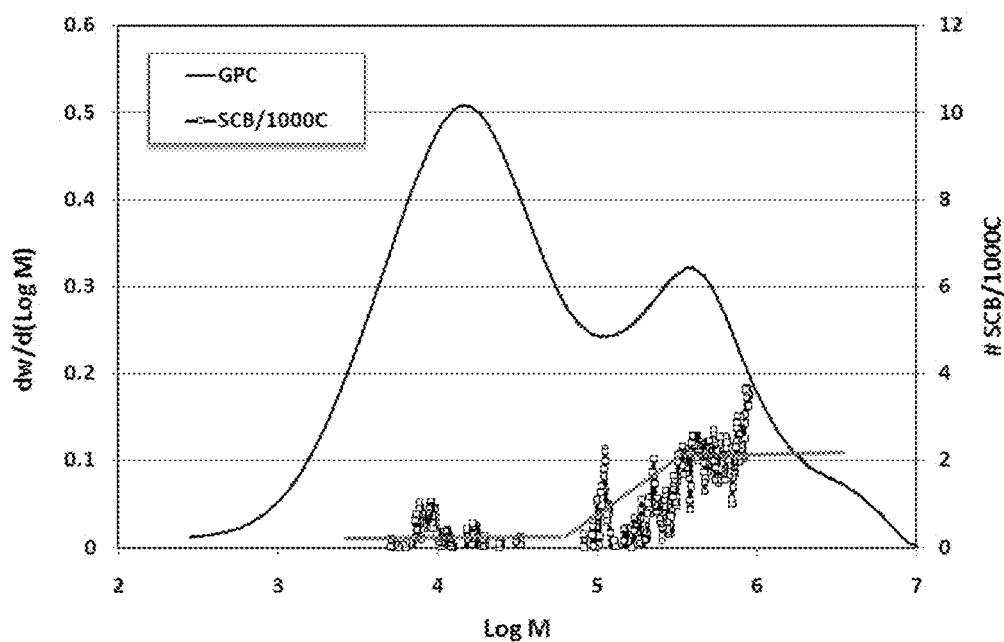
FIG. 8 is a plot of short chain branching (SCB) as a function of Log M for resin 7 from Example 3.

Resin samples R2-R7 were subjected to gel permeation chromatography and rheological analysis. GPC plots for resins R2 to R7 along with a benchmark comparative resin, designated R1, are given in FIGS. 2-4 while plots of dynamic melt viscosity as a function of frequency are presented in FIGS. 5-7. FIG. 8 provides the SCB distribution for resin R7. Resin R1 was used as a benchmark resin because it is a typical bimodal resin with high zero shear viscosity. A summary of the molecular weight and rheological data for the resins is presented in Tables 3a and 3b. For the Carreau-Yasuda equation, n was equal to 0.1818 for each sample.

TABLE 3a

| Resin No. | $M_n/1000$ | $M_w/1000$ | $M_z/1000$ | $M_w/M_n$ | $M_z/M_w$ | $\eta_0$ | MI g/10 min | HLMI g/10 min | HLMI/MI |
|---|---|---|---|---|---|---|---|---|---|
| R1* | 8.1 | 264.1 | 1069.1 | 32.6 | 3.8 | 1.52E+05 | 0.060 | 7.4 | 123 |
| R2 | 8.1 | 125.4 | 435.3 | 15.4 | 3.5 | 1.43E+04 | 0.670 | 41.6 | 62 |
| R3 | 8.1 | 258.2 | 2003.6 | 31.9 | 8.1 | 4.70E+05 | 0.052 | 10.1 | 193 |

*R1 was produced from compounds 5 and 16 on sulfated alumina

TABLE 3b

| Resin No. | Fluff Density (g/cc) | $M_n/1000$ | $M_w/1000$ | $M_z/1000$ | $M_w/M_n$ | $M_z/M_w$ | $\eta_0$ | MI g/10 min | HLMI g/10 min | HLMI/MI |
|---|---|---|---|---|---|---|---|---|---|---|
| R1 | 0.9516 | 8.1 | 264.1 | 1069.1 | 32.6 | 3.8 | 1.52E+05 | 0.060 | 7.4 | 123 |
| R4 | 0.9519 | 9.3 | 206.0 | 689.6 | 22.3 | 3.3 | 7.91E+04 | 0.083 | 15.4 | 185 |
| R5 | 0.952 | 14.1 | 262.2 | 1577.3 | 18.6 | 6.0 | 1.65E+05 | 0.029 | 16.3 | 563 |
| R6 | 0.9521 | 9.8 | 252.0 | 1322.0 | 25.9 | 5.2 | 1.54E+05 | 0.090 | 15.6 | 173 |
| R7 | 0.951 | 12.3 | 347.0 | 2420.1 | 28.3 | 7.0 | 7.45E+05 | 0.032 | 25.8 | 805 |

The data demonstrated that resins of this disclosure (i.e., EPC) displayed zero shear viscosities that were equal to or higher than the comparative resins, but had a lower viscosity at 1 to 10 rad/s when compared to the benchmark resin, R1. This suggests that resins of the type disclosed herein (i.e., EPC) produced using the novel catalyst systems described herein (i.e., POLCAT) are more shear thinning meanwhile maintaining high zero shear viscosity, and may be employed in the manufacturing of large diameter pipes and which exhibit at least equal to or better processability than the comparative resins.

While embodiments of the disclosure have been shown and described, modifications thereof can be made without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $N_L$, and an upper limit, $N_U$, is disclosed, any number falling within the range is specifically disclosed. In particular, the following numbers within the range are specifically disclosed: $N=N_L+k*(N_U-N_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two N numbers as defined in the above is also specifically disclosed.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A catalyst composition comprising:
   (a) a first metallocene complex represented by the general formula:

where $M^1$ is Ti, Zr or Hf;
   $X^1$ and $X^2$ are each independently F, Cl, Br, I, methyl, benzyl, phenyl, H, BH$_4$, a hydrocarbyloxide group having up to 20 carbon atoms, a hydrocarbylamino group having up to 20 carbon atoms, a trihydrocarbylsilyl group having up to 20 carbon atoms, OBR'$_2$ wherein R' is an alkyl group having up to 12 carbon atoms or an aryl group having up to 12 carbon atoms, and SO$_3$R" wherein R" is an alkyl group having up to 12 carbon atoms or an aryl group having up to 12 carbon atoms; and
   $Cp^1$ and $Cp^2$ are each independently a substituted or unsubstituted cyclopentadienyl group, or a substituted or unsubstituted indenyl group, where any substituent on $Cp^1$ and $Cp^2$ is H, a hydrocarbyl group having up to 18 carbon atoms or a hydrocarbylsilyl group having up to 18 carbon atoms;
   (b) a second metallocene complex, wherein the second metallocene is represented by the general formula:

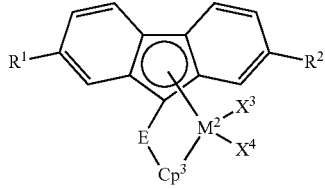

where $M^2$ is Ti, Zr or Hf;
   $X^3$ and $X^4$ are independently F, Cl, Br, I, methyl, phenyl, benzyl, H, BH$_4$, a hydrocarbyloxide group having up to 20 carbon atoms, a hydrocarbylamino group having up to 20 carbon atoms, a trihydrocarbylsilyl group having up to 20 carbon atoms, OBR'$_2$ wherein R' is an alkyl group having up to 12 carbon atoms or an aryl group having up to 12 carbon atoms, or SO$_3$R" wherein R" is an alkyl group having up to 12 carbon atoms or an aryl group having up to 12 carbon atoms;
   $R^1$ and $R^2$ are independently hydrogen or a hydrocarbyl group having up to 18 carbon atoms;
   $Cp^3$ is a substituted or unsubstituted cyclopentidienyl group, a substituted or unsubstituted indenyl group, a substituted or unsubstituted fluorenyl group, where any substituent on $Cp^3$ is H, a hydrocarbyl group having up to 18 carbon atoms or a hydrocarbylsilyl group having up to 18 carbon atoms; and
   E represents a bridging group which may comprise (i) a cyclic or heterocyclic moiety having up to 18 carbon atoms, (ii) a group represented by the general formula $E^A R^{3A} R^{4A}$, wherein $E^A$ is C or Si, and $R^{3A}$ and $R^{4A}$ are independently H or a hydrocarbyl group having up to 18 carbon atoms, (iii) a group represented by the general formula —$CR^{3B}R^{4B}$—$CR^{3C}R^{4C}$—, wherein $R^{3B}$, $R^{4B}$, $R^{3C}$, and $R^{4C}$ are independently H or a hydrocarbyl group having up to 10 carbon atoms, (iv) a group represented by the general formula —$SiR^{3D}R^{4D}$—$SiR^{3E}R^{4E}$—, wherein $R^{3D}$, $R^{4D}$, $R^{3E}$, and $R^{4E}$ are independently H or a hydrocarbyl group having up to 10 carbon atoms and wherein at least one of $R^{3A}$, $R^{3B}$, $R^{4A}$, $R^{4B}$, $R^{3C}$, $R^{4C}$, $R^{3D}$, $R^{4D}$, $R^{3E}$, $R^{4E}$, or the substituent on $Cp^3$ is (1) a terminal alkenyl group having up to 12 carbon atoms or (2) a dinuclear compound;
   (c) a transition metal complex (i) represented by general formula II:

$$M(NR_2)_y Cl_z \qquad \text{Formula II}$$

where y+z=valence of the metal, R is a hydrocarbon group having up to 12 carbon atoms and M is titanium, vanadium, zirconium, hafnium, chromium, molybdenum, tungsten, iron, cobalt, nickel, copper, or a lanthanides complex or (ii) represented by one of the following structures:

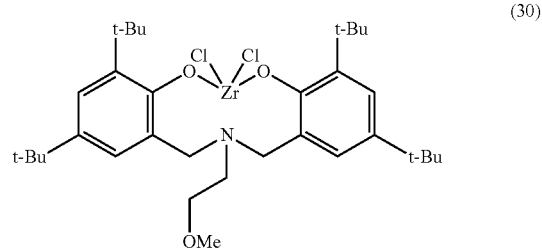
   (30)

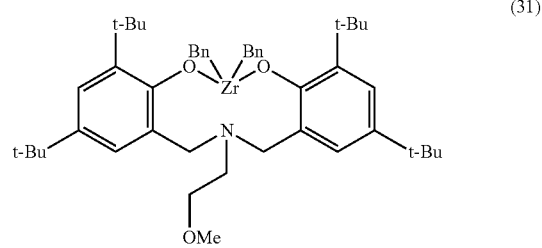
   (31)

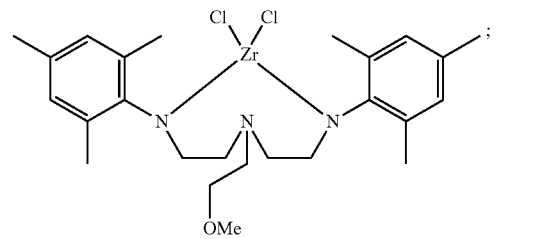
   (33)

(d) an activator-support comprising a chemically-treated inorganic solid oxide wherein the chemically-treated inorganic solid oxide comprises bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, a pillared clay, an aluminophosphate, or any combination of thereof; and (e) an optional cocatalyst, and wherein there is an absence of aluminoxanes.

2. The composition of claim 1 wherein the first metallocene comprises bis(cyclopentadienyl)hafnium dichloride; bis(n-butylcyclopentadienyl)bis(di-t-butylamido)hafnium; bis(n-propylcyclopentadienyl)zirconium dichloride; bis(1-propyl-indenyl)zirconium dichloride; a compound represented by one of the following structures:

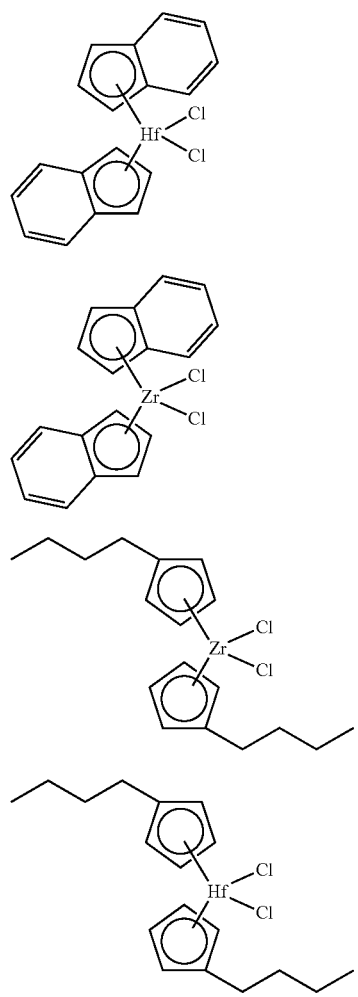

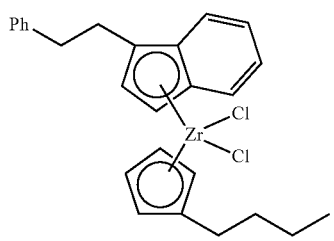

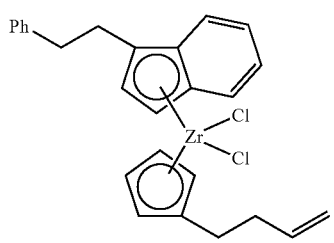

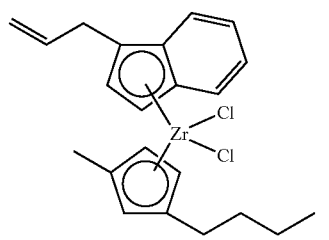

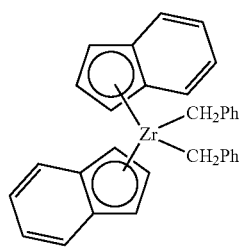

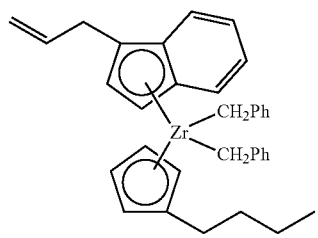

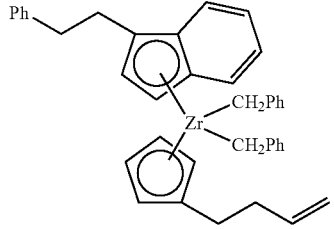

(12)
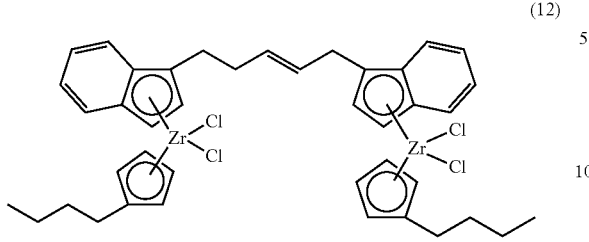
(13)
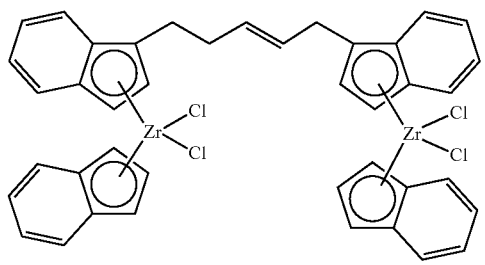
or combinations thereof.
3. The composition of claim 1 wherein the second metallocene is represented by one of the following structures:
(14)
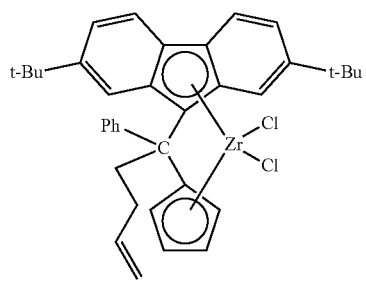
(15)
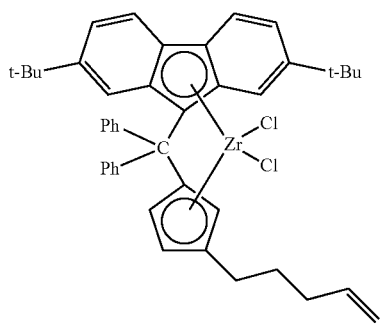
(16)
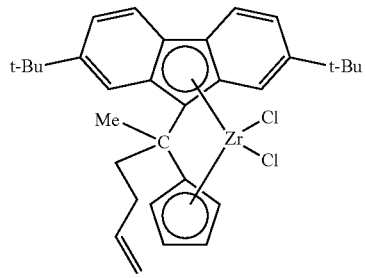
(17)
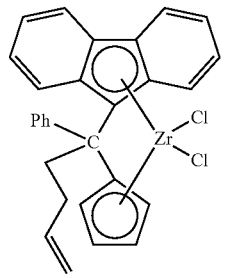
(18)
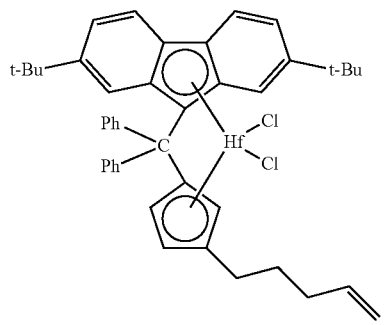
(19)
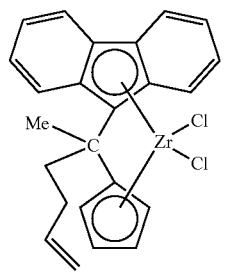

-continued
(20)
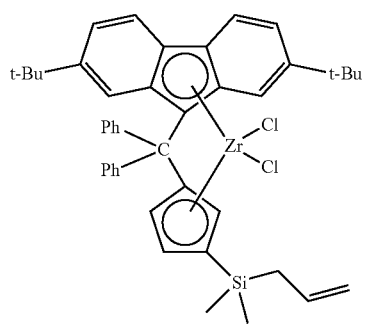
(21)
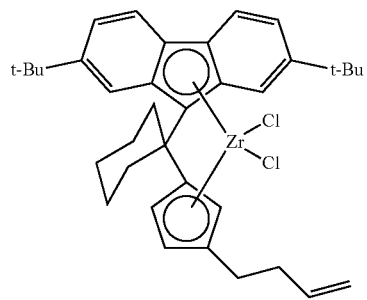
(22)
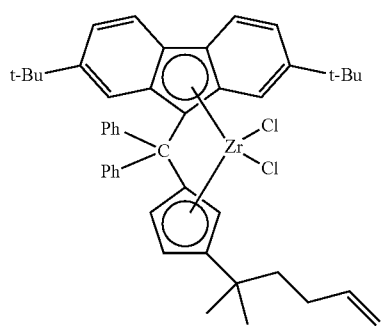
(23)
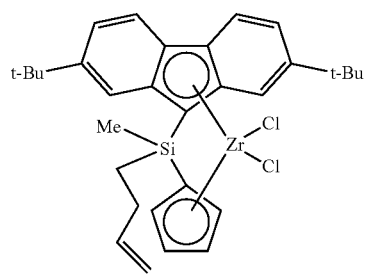
(24)
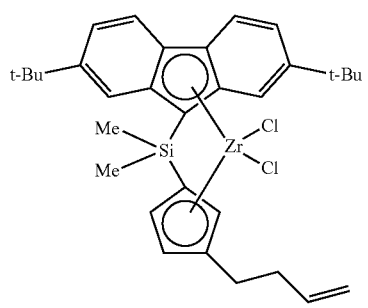
(25)
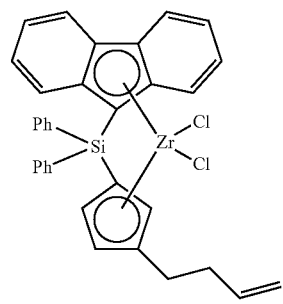
(26)
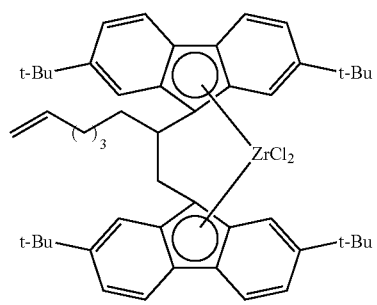
(27)
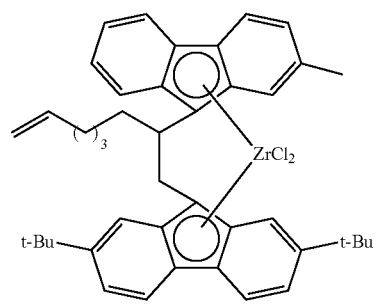
(28)
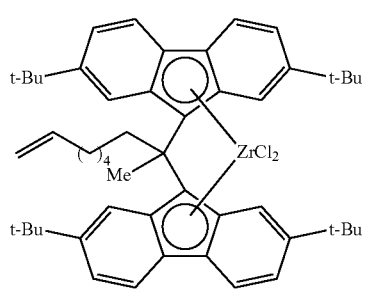

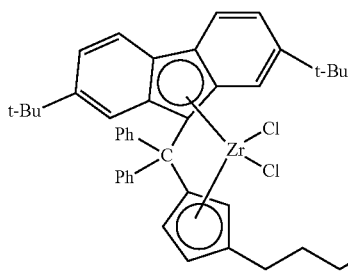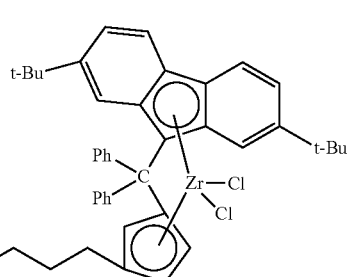

(29)

or combinations thereof.

4. The composition of claim 1 wherein the optional cocatalyst comprises a compound represented by the general formula:

$$Al(X^5)_p(X^6)_q$$

where $X^5$ is a halide, hydrocarbyloxide group, hydrocarbylamino group or combinations thereof; $X^6$ is a hydrocarbyl group having up to 18 carbon atom; p ranges from about 0 to about 2; and q is 3−p.

5. The composition of claim 1 wherein the optional cocatalyst comprises triisobutylaluminum (TiBA or TiBAl); tri-n-butylaluminum (TNBA); tri-octly-butylaluminum (TOBA); triethylaluminum (TEA); or combinations thereof.

6. The composition of claim 1 wherein the first metallocene and second metallocene are present in amounts that provide a weight ratio of the first metallocene to second metallocene of from about 1:100 to about 100:1.

7. The composition of claim 1 wherein the first metallocene, second metallocene, and activator-support are present in amounts to provide a weight ratio of the sum of the first and second metallocenes to the activator-support of from about 1:10000 to about 1:1.

8. The composition of claim 1 wherein the transition-metal complex and activator-support are present in amounts to provide a weight ratio of the non-group 4 metallocene transition-metal complex to activator-support of from about 1:10000 to 1:10.

9. The composition of claim 1 wherein the cocatalyst and activator-support are present in amounts to provide a weight ratio of cocatalyst to activator-support of from about 1:1000 to about 10:1.

10. A method comprising contacting the catalyst composition of claim 1 with one or more monomers under conditions suitable for formation of a polymer; and recovering a polymer wherein at least one of the monomers is ethylene and the polymer comprises polyethylene.

11. The method of claim 10 wherein a gel permeation chromatograph of the polymer displays (i) at least two distinctive peaks corresponding to a main body having a lower molecular weight (LMW) component and a higher molecular weight (HMW) component and (ii) a higher molecular weight tail.

12. The method of claim 11 wherein the higher molecular weight tail comprises from about 0.1 wt. % to about 20 wt. % of the polymer; and the higher molecular weight tail has a weight average molecular weight of greater than about $2 \times 10^6$ Daltons.

13. The method of claim 11 wherein the polymer has a density of from about 0.92 g/cc to about 0.96 g/cc.

14. The method of claim 11 wherein the main body of the polymer has a molecular weight distribution of from about 5 to about 60 and the polymer has an $M_z/M_w$ of greater than about 4.

15. The method of claim 11 wherein the polymer has a ratio of short-chain branching in the HMW component to short-chain branching in the LMW component (SCB@HMW Peak)/(SCB@LMW Peak) of greater than about 1 and the main body of the polymer has equal to or less than about 0.01 long chain branches per about 1,000 total carbon atoms.

16. The method of claim 11 wherein the polymer has a high-load melt index of from about 0 g/10 min. to about 100 g/10 min. and the polymer has a ratio of high-load melt index to melt index of greater than about 20.

17. The method of claim 11 wherein the polymer has a zero-shear viscosity of from about $10^5$ to about $10^8$ and the polymer has a ratio of Eta@0 to Eta@1 of greater than 3.5.

18. The method of claim 11 wherein the higher molecular weight tail comprises from about 0.5 wt. % to about 10 wt. % of the polymer and the higher molecular weight tail has a weight average molecular weight of greater than about $2.5 \times 10^6$ Daltons.

19. The method of claim 11 wherein the polymer has a density of from about 0.93 g/cc to about 0.96 g/cc.

20. The method of claim 11 wherein the main body of the polymer has a molecular weight distribution of from about 5 to about 50 and the polymer has an $M_z/M_w$ of greater than about 5.

21. The method of claim 11 wherein the polymer has a ratio of short-chain branching in the HMW component to short-chain branching in the LMW component (SCB@HMW Peak)/(SCB@LMW Peak) of greater than about 1.5 and the main body of the polymer has equal to or less than about 0.008 long chain branches per about 1,000 total carbon atoms.

22. The method of claim 11 wherein the polymer has a high-load melt index of from about 0 g/10 min. to about 75 g/10 min. and the polymer has a ratio of high-load melt index to melt index of greater than about 40.

23. The method of claim 11 wherein the polymer has a zero-shear viscosity of from about $10^5$ to about $8 \times 10^6$ and the polymer has a ratio of Eta@0 to Eta@1 of greater than 4.

24. The method of claim 10 further comprising forming the polymer into an article.

25. An article comprising the polymer of claim 11.

26. The composition of claim 1 wherein the transition metal complex is present in an amount of from about 0.01 wt. % to about 5 wt. % based on the total weight of the catalyst composition.

27. The composition of claim 1 wherein the second metallocene is represented by structure

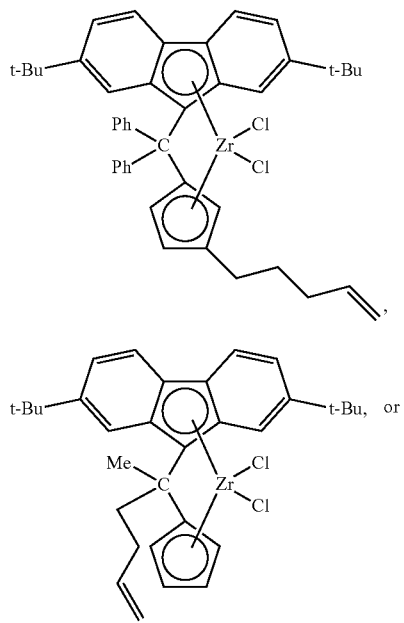

(15)

(16)

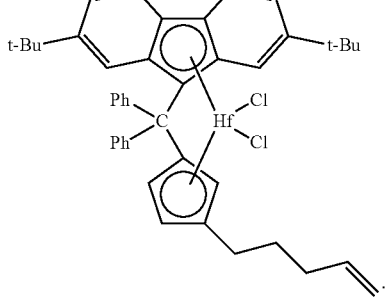

(18)

28. The composition of claim 1 wherein the second metallocene when utilized as an ethylene polymerization catalyst produces polyethylene having a weight average molecular weight of from about 200,000 Daltons to about 1,200,000 Daltons.

29. The composition of claim 1 comprising an additional optional cocatalyst wherein the additional optional cocatalyst comprises an organoboron compound, an organoborate compound or combinations thereof.

* * * * *